United States Patent [19]

Kraus et al.

[11] Patent Number: 4,684,690

[45] Date of Patent: Aug. 4, 1987

[54] AMINOPLAST ADHESIVE RESIN POWDER FOR WOOD-BASED MATERIALS OR AS A PAPER ADHESIVE, WHICH ELIMINATES LITTLE FORMALDEHYDE, ITS PREPARATION, AND A FORMULATED AMINOPLAST ADHESIVE RESIN POWDER

[75] Inventors: Friedrich Kraus, Bensheim; Guenther Matthias; Otto Wittmann, both of Frankenthal; Hans Diem, Mannheim, all of Fed. Rep. of Germany

[73] Assignee: BASF Aktiengesellschaft, Ludwigshafen, Fed. Rep. of Germany

[21] Appl. No.: 876,758

[22] Filed: Jun. 20, 1986

[30] Foreign Application Priority Data

Jun. 22, 1985 [DE] Fed. Rep. of Germany ....... 3522358

[51] Int. Cl.⁴ .......................... C08L 61/28; C08K 3/30
[52] U.S. Cl. .................................... 524/419; 524/418; 524/421; 524/542; 525/517
[58] Field of Search ................ 525/517, 934; 524/418, 524/419, 542, 492, 904, 421

[56] References Cited

U.S. PATENT DOCUMENTS 3,827,995  8/1974  White et al. .................... 525/517 X Primary Examiner—Theodore E. Pertilla
Attorney, Agent, or Firm—Keil & Weinkauf

[57] ABSTRACT

In a proposed aminoplast adhesive resin powder for wood-based materials, which eliminates little formaldehyde, the resin is a mixture of (a) from 40 to 75 parts by weight of a urea/formaldehyde resin having a molar ratio of urea to formaldehyde of from 1:1.4 to 1:2, (b) from 10 to 20 parts by weight of a melamine/formaldehyde resin having a molar ratio of melamine to formaldehyde of from 1:1.3 to 1:3, (c) from 15 to 25 parts by weight of milled urea and (d) from 0.3 to 5 parts by weight of a flow improver, as well as up to 10 parts by weight of water and, if required, up to 10 parts by weight of other additives, the number of parts by weight of the components summing to 100.

9 Claims, No Drawings

AMINOPLAST ADHESIVE RESIN POWDER FOR WOOD-BASED MATERIALS OR AS A PAPER ADHESIVE, WHICH ELIMINATES LITTLE FORMALDEHYDE, ITS PREPARATION, AND A FORMULATED AMINOPLAST ADHESIVE RESIN POWDER

The present invention relates to an aminoplast adhesive resin powder for wood-based materials or as a paper adhesive, in particular for the production of particle boards or for gluing surfaces, which eliminates little formaldehyde, a process for the preparation of the aminoplast adhesive resin, and a ready-formulated aminoplast adhesive resin.

Adhesive resin powders are important when the transportation costs for aqueous adhesive resin solutions are too high compared with the costs of spray drying. Over the past few years, low-formaldehyde adhesive resins have generally become increasingly important, particularly for the production of particle boards. This is because the pungent odor of formaldehyde causes a certain annoyance, and irritation occurs at higher concentrations. The preparation of low-formaldehyde amino resins in powder form is very difficult and has remained an unsolved problem to date. There are two reasons for this. First, low-formaldehyde adhesive resin solutions contain components which adhere to the wall of the spray dryer, melt, run down or stick to the filters and block them and consequently cause a sharp increase in pressure after a short time, which results in production being terminated. However, even if this disadvantage is accepted, adhering of the low-formaldehyde powder components results in separation into high-formaldehyde and low-formaldehyde components, and the objective of a low formaldehyde content in a finished product is not achieved. Mixing high-formaldehyde components with low-formaldehyde ones, in the extreme case with urea, also does not give a powder resin which is easy to handle, since this mixture has short shelf life and finally gives solids which are difficult to dissolve. Another difficulty arises from the inadequate adhesive power of adhesive resins which have a very low formaldehyde content. In the case of liquid resins, this problem is solved by means of special condensation techniques, in which the starting material has a high formaldehyde content, ie. a high molar ratio of formaldehyde to urea, and the molar ratio is constantly decreased in the course of the condensation, by the stepwise addition of urea. Where fairly high requirements in respect of strength and resistance to swelling have to be met, the resin is modified with melamine. These resins, either modified or unmodified, are reacted with alcohols, and it is assumed that some of the hydroxymethyl groups are etherified with elimination of water. For the above reasons, this stepwise reduction in the molar ratio cannot be carried out when the resin solution to be dried is subjected to spraydrying. Drying all resin components of a melamine resin together also does not result in improvement.

It is an object of the present invention to provide, for the first time, an aminoplast adhesive resin powder for wood-based materials, which eliminates little formaldehyde, and a process for the preparation of the aminoplast adhesive resin.

We have found that this object is achieved by an aminoplast adhesive resin powder of the stated type, wherein the resin is a mixture of (a) from 40 to 75 parts by weight of a urea/formaldehyde resin having a molar ratio of urea to formaldehyde of from 1:1.4 to 1:2,
(b) from 10 to 20 parts by weight of a melamine/formaldehyde resin having a molar ratio of melamine to formaldehyde of from 1:1.3 to 1:3,
(c) from 15 to 25 parts by weight of milled urea and
(d) from 0.3 to 10, in particular from 0.3 to 5, parts by weight of a flow improver, as well as up to 10 parts by weight of water and, if required, up to 10 parts by weight of other additives, the number of parts by weight of these components summing to 100.

In a preferred embodiment, the aminoplast adhesive resin powder is a mixture of (a) from 60 to 68 parts by weight of a urea formaldehyde resin having a molar ratio of urea to formaldehyde of from 1:1.4 to 1:1.8,
(b) from 12 to 16 parts by weight of a melamine/formaldehyde resin having a molar ratio of melamine to formaldehyde of from 1:1.3 to 1:1.8,
(c) from 16 to 22 parts by weight of milled urea and
(d) from 0.5 to 2 parts by weight of a flow improver, as well as up to 10 parts by weight of water and, if required, up to 10 parts by weight of other additives.

An aminoplast adhesive resin powder of the stated type wherein (a) the urea/formaldehyde resin has a molar ratio of urea to formaldehyde of about 1:1.6 and
(b) the melamine/formaldehyde resin has a molar ratio of melamine to formaldehyde of about 1:1.5 is particularly preferred.

The urea particularly advantageously has a mean particle size of less than 0.1 mm, although the particle size may also be much smaller, ie. down to 0.02 mm.

The aminoplast adhesive resin powder preferably contains a hydrophobic or a hydrophilic silica as a flow improver.

The novel aminoplast adhesive resin may furthermore contain other additives, in particular those conventionally used for aminoplast adhesive resins. It may have a residual water content which corresponds to a residual water content of from 0.1 to 2% by weight in the urea/formaldehyde resin component and a similar content in the melamine/formaldehyde resin component.

In the process for the preparation of the aminoplast adhesive resin powder, the urea/formaldehyde resin and the melamine/formaldehyde resin are spray-dried separately from one another and mixed with the urea and flow improver at below 30° C.

It has proven particularly advantageous for the aminoplast adhesive resin powder to contain, as an additive, a soluble sulfite or bisulfite in an amount of from 0.2 to 2 parts by weight, based on the total amount of resin components. This is particularly advantageously an alkali metal or ammonium sulfite or bisulfite, sodium sulfite, $Na_2SO_3$, being particularly preferably used. The amount of sulfite or bisulfite is preferably from 0.5 to 1, in particular about 0.7, part by weight, based on the total amount of resin components. The sulfite or bisulfite can be added in powder form or in solution.

The addition of the sulfite or bisulfite results in a reduction in the viscosity of the solutions prepared from the adhesive powder, so that these solutions are easier to handle. Moreover, the miscibility of the aminoplast adhesive resin with water is increased. Finally, when the resin solution to be dried is prepared with the addition of sulfite or bisulfite, it is not necessary constantly to adjust the pH of the adhesive resin mixture during the addition of urea to the resin solution.

In an alternative process for the preparation of the novel aminoplast adhesive resin powder according to a preferred embodiment which contains from 3 to 10 parts by weight of hydrophilic silica as a flow improver, the following procedure is adopted. A mixture of urea/formaldehyde resin and melamine/formaldehyde resin is prepared by mixing, preferably, solutions of the two resins, free urea and from 3 to 10 parts by weight of hydrophilic silica, for example a commercial product obtainable under the name Sipernat 22 ®, are dissolved or suspended in the solution to be dried, and this mixture is then spraydried.

The effect obtained with the alternative process is surprising. If the intention were to protect the urea by coating it before it became sticky on the tower wall, the skilled worker will be more inclined to choose a hydrophobic compound since a hydrophilic one becomes coated with water, and sticky particles will then be expected to form. This version of the process dispenses with the additional operation of mixing the adhesive resin components after spraydrying, a step which is required in the first version. Furthermore, separate storage and cooling of the components is dispensed with.

The present invention furthermore relates to a formulated aminoplast adhesive resin powder containing an aminoplast adhesive resin powder of the type defined above. A formulated resin powder of this type already contains a curing agent in the mixture and can therefore be stored and delivered in a ready-for-use form. If desired, the formulated aminoplast adhesive resin powder may also contain a joint filler, for example a powder.

The present invention furthermore relates to a mixture of the aminoplast adhesive resin powder defined above and other, conventional adhesives. Examples of the latter are organic adhesives of natural or synthetic origin.

The novel aminoplast adhesive resin or its mixtures may also be used, for example, as a paper adhesive, ie. an adhesive for paper, kraft paper, cardboard, corrugated board and similar materials.

The curing agent used in the formulated aminoplast adhesive resin powder must be such that it does not react with the pulverulent resin mixture but effects curing only in the aqueous adhesive liquor or in the wood-based material, the particle board or plywood board. Suitable curing agents can easily be selected from among the known prior art curing agents. Examples of particularly suitable curing agents of this type are ammonium salts of strong inorganic acids, if appropriate mixed with flours, starch, kaolin, highly condensed adhesive resins based on urea or melamine, pulverulent organic acids, such as maleic acid, fumaric acid, citric acid, tartaric acid, stearic acid, powdered nutshells,. coconut shells or olive seeds.

The urea/formaldehyde resin component must possess adhesive properties. The content of methylol groups should be from 15 to 20% by weight, the gelling time should be from 15 to 20 minutes at 50° C. with 10% of a 15% strength $NH_4Cl$ solution for a 2:1 solution in water.

The melamine/formaldehyde resin component should likewise possess adhesive properties. The content of methylol groups should be from 20 to 28% by weight, and the gelling time should be from 35 to 40 minutes in a 1:1 solution in water with 10% of a 15% strength $NH_4Cl$ solution at 40° C.

To prepare a preferred embodiment of the aminoplast adhesive resin powder, the urea/formaldehyde resin solution is spray-dried to give a powder having a residual water content of from 0.1 to 2% by weight, and then mixed with a resin powder, dried to the same residual water content of from 0.1 to 2% by weight by spray-drying a melamine/formaldehyde resin solution, and with milled urea and hydrophobic or hydrophiic silica at below 30° C., the resin powder which emerges from the hot spray-dryer being cooled beforehand. A particularly preferred mixture may possess, for example, the following composition:

65 parts by weight of urea/formaldehyde resin having a molar ratio of urea to formaldehyde of about 1:1.6, 15 parts by weight of melamine/formaldehyde resin having a molar ratio of melamine to formaldehyde of about 1:1.5, 17 parts of urea and 0.85 part of $SiO_2$.

Etherification of the resin components is not necessary.

The aminoplast adhesive resin powder according to the invention possesses the following properties:

readily redissolved, good grades of particle board, good mechanical properties and low level of formaldehyde elimination, mechanical properties being understood as good swellability and good mechanical shear strength; long shelf life without deterioration in quality, ie. no agglomeration, and retention of adhesive properties.

The Examples and comparative examples which follow illustrate the invention.

EXAMPLE 1

65 parts of a urea/formaldehyde condensate powder having a molar ratio of urea to formaldehyde of 1:1.6, containing 17% of methylol groups and having a gelling time of 17 minutes in a solution of 2 parts of powder in 1 part of water were initially taken in a mixer. Thereafter, 15 parts of a melamine resin powder having a molar ratio of melamine to formaldehyde of 1:1.5, containing 25% of methylol groups and having a gelling time of 40 minutes in a 1:1 solution in water were added. 17 parts of milled urea and 0.85 part of hydrophobic silica (Sipernat D 17 ® (Degussa)) were added to the mixture, and thorough mixing was carried out.

495 parts of a mixture of 2 parts of this powder and 1 part of water were converted to an adhesive liquor with 50 parts of a 20% strength ammonium chloride solution and 55 parts of water. The gelling time for the liquor at 100° C. was 149 seconds. Spruce chips were mixed with liquor in an amount such that the chip mixture contained 6% of solid resin. The chips were pressed at 180° C. for 4 minutes to give an 18.7 mm thick particle board.

Testing gave the following results:

Density: 653 kg/m$^3$

Shear strength: 1.72 N/mm$^2$

Swelling after 2 hours: 29.1%

Swelling after 24 hours: 34.7%

Formaldehyde elimination (FESYP): 6 mg of HCOH/100 g of absolutely dry board

COMPARATIVE EXAMPLE 1

A board produced similarly to Example 1 according to the invention, but using only 3 parts of melamine resin instead of 15 parts, exhibited 31.5% swelling after 2 hours and 38% swelling after 24 hours, but otherwise had the same properties.

COMPARATIVE EXAMPLE 2

A resin mixture prepared similarly to Example 1 according to the invention but without the silica can no longer be dissolved after a few days and therefore could not be processed to a board.

COMPARATIVE EXAMPLE 3

A board produced similarly to Example 1 according to the invention, but without ad-ditional urea, exhibited formaldehyde elimination of more than 10 mg of HCOH/100 g of absolutely dry board.

EXAMPLE 2

Solution A

A precondensate of 12,792 kg of formaldehyde (calculated as 100%) and 895.5 kg of solid urea, dissolved in 1,791 kg of water, 733 L of 40% strength formaldehyde (corresponding to 324.5 kg, calculated as 100%), 1,135 L of a 68.9% strength urea solution (920 kg of solid urea), 237 L of 25% strength ammonia solution (53.8 kg of $NH_3$, calculated as 100%) and 800 L of water were initially taken in a stirred kettle. The mixture was heated to 96° C., after which the solution was left at this temperature for 10 minutes and then brought to pH 6.4 with 10% strength formic acid. Condensation was continued until a solution diluted in the ratio of 1:8 with water had a turbidity temperature of 15° C. 865 L of a 68.9% strength urea solution (691 kg of solid urea) were then added, after which the pH was 5.4. Condensation was continued at 96° C. until a solution diluted in the ratio of 1:8 with water showed a turbidity temperature of 38° C. The pH was brought to 9.0 with 25% strength sodium hydroxide solution, and the solution was cooled.

Solution B

583 L of 40% strength formaldehyde (258 kg of formaldehyde, calculated as 100%) and 305 L of water were initially taken in a stirred kettle and brought to pH 9.2 with 25% strength sodium hydroxide solution. Thereafter, 677 kg of melamine were added and the kettle was heated to 96° C. Condensation was then continued until a solution diluted with water in a ratio of 1:5 showed a turbidity temperature of 40° C. Thereafter, 147 L of water were added and the solution was cooled.

Solutions A and B were mixed, and 1,276 L of a 68.9% strength urea solution (1,020 kg of solid urea) and 297 kg of hydrophilic silica (Sipernat 22 ®) were added to the mixture. The solids content of the solution was 51%.

The solution was left to stand for 12 hours and then spray-dried. 600 kg/hour of powder having a residual water content of about 1% were obtained at a tower outlet temperature of 84° C.

A 2:1 solution of the powder in water had the following properties:
pH: 7.6
viscosity at 20° C.: 3,500 mPa.s
gelling time at 70° C. with a 10% strength ammonium chloride solution: 31 minutes 668 parts of a mixture of 2 parts of this powder and 1 part of water were converted to an adhesive liquor with 64 parts of a 20% strength ammonium chloride solution and 70 parts of water. The gelling time of the liquor at 100° C. was 147 seconds. Spruce chips were mixed with liquor in an amount such that the chip mixture contained 6% solid resin. The chips were pressed at 180° C. for 4 minutes to give a 17.5 mm thick particle board.

Testing gave the following results:
density: 646 kg/m$^3$
shear strength: 1.85 N/mm$^2$
swelling after 2 hours: 26.7%
swelling after 24 hours: 30.5%
release of formaldehyde (FESYP): 5 mg of HCOH/100 g of absolutely dry board

We claim:

1. An aminoplast adhesive resin powder for wood-based materials, which eliminates little formaldehyde, wherein the resin is a mixture comprising
   (a) from 40 to 75 parts by weight of a urea/formaldehyde resin having a molar ratio of urea to formaldehyde of from 1:1.4 to 1:2,
   (b) from 10 to 20 parts by weight of a melamine/formaldehyde resin having a molar ratio of melamine to formaldehyde of from 1:1.3 to 1:3,
   (c) from 15 to 25 parts by weight of milled urea and
   (d) from 0.3 to 10 parts by weight of a flow improver, as well as up to 10 parts by weight of water, the number of parts by weight of these components summing to 100.

2. An aminoplast adhesive resin powder as claimed in claim 1, which is a mixture comprising
   (a) from 60 to 68 parts by weight of a urea/formaldehyde resin having a molar ratio of urea to formaldehyde of from 1:1.4 to 1:1.8,
   (b) from 12 to 16 parts by weight of a melamine/formaldehyde resin having a molar ratio of melamine to formaldehyde of from 1:1.3 to 1:1.8,
   (c) from 16 to 22 parts by weight of milled urea and
   (d) from 0.5 to 2 parts by weight of a flow improver, as well as up to 10 parts by weight of water.

3. An aminoplast adhesive resin powder as claimed in claim 1, wherein
   (a) the urea/formaldehyde resin has a molar ratio of urea to formaldehyde of about 1:1.6 and
   (b) the melamine/formaldehyde resin has a molar ratio of melamine to formaldehyde of about 1:1.5.

4. An aminoplast adhesive resin powder as claimed in claim 1, wherein the urea has a mean particle size of less than 0.1 mm.

5. An aminoplast adhesive resin powder as claimed in claim 1, wherein the flow imporver is a hydrophobic silica.

6. An aminoplast adhesive resin powder as claimed in claim 1, wherein the flow improver is a hydrophilic silica.

7. An aminoplast adhesive resin powder as claimed in claim 1, which contains, as an additive, a soluble sulfite or bisulfite in an amount of from 0.2 to 2 parts by weight, based on the total amount of resin components.

8. An aminoplast adhesive resin powder as claimed in claim 7, which contains an alkali metal or ammonium sulfite or bisulfite.

9. An aminoplast adhesive resin powder as claimed in claim 1, which contains from 3 to 10 parts by weight of hydrophilic silica as the flow improver.

* * * * *